(12) United States Patent
Luo et al.

(10) Patent No.: US 11,977,360 B2
(45) Date of Patent: May 7, 2024

(54) DESIGNING METHOD FOR FOPD-GESO CONTROLLER

(71) Applicant: HUAZHONG UNIVERSITY OF SCIENCE AND TECHNOLOGY, Hubei (CN)

(72) Inventors: Ying Luo, Hubei (CN); Pengchong Chen, Hubei (CN)

(73) Assignee: HUAZHONG UNIVERSITY OF SCIENCE AND TECHNOLOGY, Hubei (CN)

(*) Notice: Subject to any disclaimer, the term of this patent is extended or adjusted under 35 U.S.C. 154(b) by 0 days.

(21) Appl. No.: 18/024,978

(22) PCT Filed: Mar. 27, 2021

(86) PCT No.: PCT/CN2021/083448
§ 371 (c)(1),
(2) Date: Mar. 7, 2023

(87) PCT Pub. No.: WO2022/001242
PCT Pub. Date: Jan. 6, 2022

(65) Prior Publication Data
US 2023/0400824 A1    Dec. 14, 2023

(30) Foreign Application Priority Data
Jun. 29, 2020    (CN) .......................... 202010611608.3

(51) Int. Cl.
*G05B 17/02*    (2006.01)
(52) U.S. Cl.
CPC .................. *G05B 17/02* (2013.01)

(58) Field of Classification Search
CPC ..................................................... G05B 17/02
See application file for complete search history.

(56) References Cited

FOREIGN PATENT DOCUMENTS

| CN | 102611368 | 7/2012 |
|---|---|---|
| CN | 103124158 | 5/2013 |

(Continued)

OTHER PUBLICATIONS

Yang et al. Fractional order PD controller based on ADRC algorithm for DC motor, 2014 School of Automation Beijing Institute of Technology Beijing 100081, pp. 1-6 (Year: 2014).*

(Continued)

*Primary Examiner* — Chad G Erdman
(74) *Attorney, Agent, or Firm* — JCIPRNET

(57) ABSTRACT

A designing method for a fractional order proportional derivative (FOPD)-generalized extended state observer (GESO) controller includes the following steps: S1, selecting an FOPD controller and a GESO to control a motor speed loop, and designing the FOPD controller and the GESO; S2, performing compensation and simplification on a control object of the speed loop by using total disturbance estimated by the GESO to obtain a compensated speed loop control model, the compensated speed loop control model reflecting the characteristics that tracking performance is only related to the FOPD controller, and that anti-interference performance is only related to a bandwidth $\omega_o$ of the GESO; and S3, respectively solving unknown parameters in the FOPD controller and the GESO. The present method achieves non-overshoot tracking of the speed of a permanent magnet synchronous motor, has excellent anti-interference performance, and resists external load and model changes.

9 Claims, 3 Drawing Sheets

(56) References Cited

FOREIGN PATENT DOCUMENTS

| CN | 103124158 A | * | 5/2013 |
|---|---|---|---|
| CN | 103605290 | | 2/2014 |
| CN | 109828455 | | 5/2019 |
| CN | 110635734 | | 12/2019 |

OTHER PUBLICATIONS

Jiawei Yang et al., "Fractional order PD controller based on ADRC algorithm for DC motor", 2014 IEEE Conference and Expo Transportation Electrification Asia-Pacific (ITEC Asia-Pacific), Nov. 2014, pp. 1-6.

"International Search Report (Form PCT/ISA/210) of PCT/CN2021/083448," dated Jun. 24, 2021, with English translation thereof, pp. 1-6.

"Written Opinion of the International Searching Authority (Form PCT/ISA/237) of PCT/CN2021/083448," dated Jun. 24, 2021, pp. 1-5.

* cited by examiner

DESIGNING METHOD FOR FOPD-GESO CONTROLLER

CROSS-REFERENCE TO RELATED APPLICATION

This application is a 371 of international application of PCT application serial no. PCT/CN2021/083448, filed on Mar. 27, 2021, which claims the priority benefit of China application no. 202010611608.3, filed on Jun. 29, 2020. The entirety of each of the above mentioned patent applications is hereby incorporated by reference herein and made a part of this specification.

TECHNICAL FIELD

The disclosure belongs to the related technical field of controller design, and more specifically relates to a designing method for a FOPD-GESO controller.

DESCRIPTION OF RELATED ART

With the advantages of high power density, simple structure, high efficiency, and large torque-to-inertia ratio, permanent magnet synchronous motors are commonly adopted in aerospace, industrial robots, and CNC machine tools. However, since the control performance of permanent magnet synchronous motors is influenced by parameter changes, load torque, dynamics for modeling and so on, the key of design lies in which controller to use and the design of the controller. At present, PI controllers are mostly adopted for the speed loop of permanent magnet synchronous motors. Although PI controllers are able to meet the general control requirements, they are unable to meet the increasing requirements for performance improvement.

Active disturbance rejection control (ADRC) technology is developed by Chinese scholar Jingqing Han, and the high performance in disturbance rejection of ADRC technology has been verified in many fields. However, researchers and operators in the industrial field have encountered obstacles in tuning parameters of the ADRC technology, and the application of ADRC technology is therefore restricted. Fractional-order controller is a general form of an integer-order controller, and related research and applications have been carried out commonly in recent years. Moreover, it has been verified that the control performance of fractional-order controller is improved as compared with integer-order controllers. Therefore, in the present disclosure, with the combination of the advantages of fractional-order controller and ADRC, a FOPD-GESO is provided, which is composed of fractional-order PD (FOPD) controller and generalized extended state observer (GESO).

SUMMARY

To overcome the above defects or meet the needs for improvement of related art, the present disclosure provides a designing method for a fractional order proportional derivative (FOPD)-generalized extended state observer (GESO) controller (FOPD-GESO) controller. By designing GESO and FOPD, the compensated speed loop control model, which is obtained after making compensation to the control object of the speed loop, reflects the characteristics that tracking performance is only related to the FOPD controller, and that anti-disturbance performance is only related to a bandwidth $\omega_o$ of the GESO, that is, satisfying the principle of separation. The above characteristic is utilized to solve the unknown parameters in the FOPD controller and observer independently. By selecting the appropriate frequency-domain index (i.e., phase margin and crossover frequency), the tracking performance with basically no overshoot is obtained through the control of the FOPD, and then adjusted by adjusting the value of $\omega_o$.

To achieve the above purpose, a designing method for a FOPD-GESO controller is provided in the present disclosure, and the designing method includes the following steps: S1, selecting an FOPD controller and a GESO to control a motor speed loop, and designing the FOPD controller and the GESO according to the speed control object of the motor speed loop; S2, performing compensation and simplification on the speed control object of the motor speed loop by using total disturbance estimated by the GESO to obtain a compensated speed loop control model, the compensated speed loop control model reflects the characteristics that tracking performance is only related to the FOPD controller, and that anti-disturbance performance is only related to a bandwidth $\omega_o$ of the GESO; and S3, respectively solving unknown parameters $K_d$, $K_p$, $\mu$ and L in the FOPD controller and the GESO according to the characteristics reflected by the compensated speed loop control model in step S2.

Further preferably, in step S1, the GESO is:

$$\begin{cases} \begin{bmatrix} \dot{z}_1 \\ \dot{z}_2 \\ \dot{z}_3 \end{bmatrix} = \begin{bmatrix} 0 & 1 & 0 \\ 0 & -a & 1 \\ 0 & 0 & 0 \end{bmatrix} \begin{bmatrix} z_1 \\ z_2 \\ z_3 \end{bmatrix} + \begin{bmatrix} 0 \\ b_0 \\ 0 \end{bmatrix} u + L(y - \hat{y}) \\ \hat{y} = \begin{bmatrix} 1 & 0 & 0 \end{bmatrix} \begin{bmatrix} z_1 \\ z_2 \\ z_3 \end{bmatrix} \end{cases}$$

In the formula, $L=[\beta_1 \; \beta_2 \; \beta_3]^T$ is the gain of GESO, $z_1$, $z_2$, and $z_3$ are the outputs of ESO, $z_1$ and $z_2$ respectively estimate the derivatives of y and y, $z_3$ is the estimated total disturbance, y is the system output, u is the control rate, that is, the input of the control object of motor speed, a is the parameter of the motor speed object, $b_0=b$, and b is the motor speed loop object parameter.

Further preferably, the transfer function of the FOPD controller is:

$$C_{FOPD}(s) = K_p + K_d s^\mu$$

In the formula, $C_{FOPD}(s)$ denotes the FOPD controller, $K_p$ and $K_d$ are the proportional and differential gains, u is the differential order, $\mu \in (0, 2)$, and s is the Laplacian.

Further preferably, in step S2, the total disturbance estimated by the GESO is utilized, and the estimated total disturbance is performed according to the following formula:

$$u = \frac{u_0 - z_3}{b}$$

In the formula, b is the motor speed loop object parameter, and $u_0$ is the output of the FOPD controller.

Further preferably, in step S2, the compensated speed loop control model is performed according to the following formula:

$$P_c(s) = \frac{Y(s)}{U_0(s)} = \frac{1}{s(s+a)}$$

In the formula, $P_c(s)$ is the compensated speed loop control model.

Further preferably, in step S3, the unknown parameters in the FOPD controller are solved according to the following steps: S31, constructing the closed-loop control system of the FOPD controller, the gain-phase margin tester and the compensated speed loop control object; and S32, using the constraint conditions and boundary conditions of the closed-loop control system to assign values to the amplitude margin A, the phase margin $\phi$, the fractional order $\mu$ and frequency $\omega$, and calculating unknown parameters in the FOPD controller.

Further preferably, in step S31, the transfer function of the closed-loop control system is expressed as follows:

$$G(s) = \frac{M_T(A, \phi)C_{FOPD}(s)P_c(s)}{1 + M_T(A, \phi)C_{FOPD}(s)P_c(s)}$$

The characteristic equation of the above transfer function is expressed as follows:

$$D(K_p, K_d, \mu, A, \phi; s) = s(s+a) + Ae^{-j\phi}(K_p + K_d s^\mu)$$

In the formula, A is the amplitude margin, and $\phi$ is the phase margin.

Further preferably, in step S32, the constraint conditions refer to phase margin, crossover frequency and ITAE index, and the phase margin is performed according to the following relation formula:

$$\arg[C_{FOPD}(j\omega)P_c(j\omega)]_{\omega=\omega_{gc}} = -\pi + \phi$$

In the formula, $\omega_{gc}$ is the crossover frequency, $\omega$ is the frequency, $C_{FOPD}(j\omega)$ is the fractional order controller, and $P_c(j\omega)$ is the compensated speed loop control model.

The crossover frequency is carried out according to the following relation formula:

$$\|C_{FOPD}(j\omega)P_c(j\omega)\|_{\omega=\omega_{gc}}|_{dB} = 0$$

In the formula, dB is the unit of amplitude.

The ITAE index is carried out according to the following relation formula:

$$J_{ITAE} = \int_0^\infty t|e(t)|dt$$

In the formula, t is the real-time simulation time, e(t) is the difference between the reference input and the system output, and $J_{ITAE}$ is the ITAE index.

Further preferably, the boundary condition refers to a complex root boundary, and the formulas of the unknown parameters $K_d$ and $K_p$ are obtained according to the complex root boundary condition as follows:

$$K_d = \frac{\omega^2 S_1 - aC_1\omega}{A\omega^\mu S_2},$$

$$K_p = \frac{\omega^2 - (AC_1 K_d \omega^\mu C_2 + AS_1 K_d \omega^\mu S_2)}{AC_1}$$

$$S_1 = \sin\phi, \ C_1 = \cos\phi$$

$$S_2 = \sin\frac{\mu\pi}{2}, \ C_2 = \cos\frac{\mu\pi}{2}$$

$$E = K_p + K_d\omega^\mu C_2$$

$$F = K_d\omega^\mu S_2$$

In the formula, $S_1$, $S_2$, $C_1$, $C_2$, E and F are intermediate variables.

Further preferably, in step S3, the solution of the unknown parameter L in the GESO is to select $\omega_o$ according to the actual required anti-disturbance performance, and the unknown parameter L is calculated according to the following formula:

$$\beta_1 = 3\omega_o$$

$$\beta_2 = 3\omega_o^2$$

$$\beta_3 = \omega_o^3$$

$$L = [\beta_1 \beta_2 \beta_3]^T$$

In the formula, $\omega_o$ is the bandwidth of GESO.

Generally speaking, compared with the related art, the above technical solution conceived by the present disclosure has the following advantageous effects:

1. The present disclosure verifies that the provided controller satisfies the principle of separation through frequency-domain analysis, that is, dynamic tracking and disturbance rejection may be realized by FOPD controller and GESO respectively. According to this characteristic, the respective unknown parameters of the FOPD controller and GESO may be calculated independently to simplify the calculation complexity.
2. By adopting the fractional-order controller and utilizing the advantages of the fractional-order controller itself, the present disclosure achieves non-overshoot tracking of the speed of a permanent magnet synchronous motor, improves tracking accuracy, has excellent anti-disturbance performance, and resists external load and model changes.
3. In the present disclosure, through the designed GESO, it is possible to estimate external disturbances, dynamics for modeling, etc., and then active compensation is performed to achieve superior anti-disturbance performance. The present disclosure provides a controller design strategy for the provided controller, which may meet the frequency-domain index required by users.

DESCRIPTION OF THE EMBODIMENTS

In order to make the purpose, technical solution and advantages of the present disclosure more clear, the present disclosure will be further described in detail below in conjunction with the accompanying drawings and embodiments. It should be understood that the specific embodiments described here are only used to explain the present disclosure, not to limit the present disclosure. In addition, the technical features involved in the various embodiments of the present disclosure described below can be combined with each other as long as they do not constitute a conflict with each other.

Figure 1:
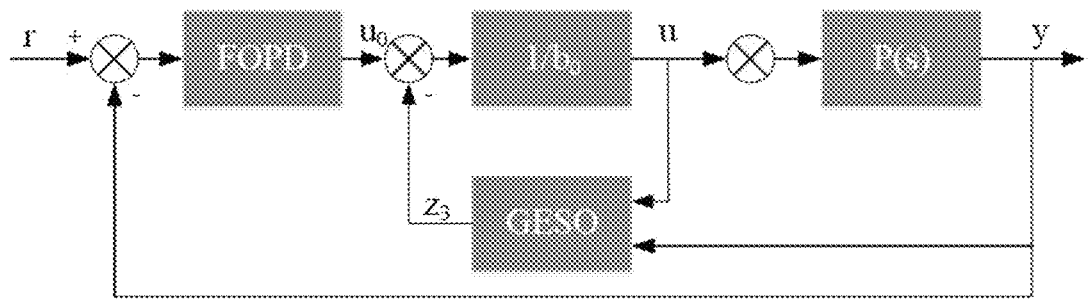
FIG. 1 shows a speed loop feedback control system for a permanent magnet synchronous motor constructed according to a preferred embodiment of the present disclosure.

S1 Constructing a Relationship Between Motor Speed Loop and Fractional Order Active Disturbance Rejection Controller (1) In the motor speed loop system of the object to be controlled, a fractional order (FO) PD controller and a generalized extended state observer (GESO) are selected to control the speed loop system of the motor to be regulated. The control system is shown in FIG. 1.

The motor speed loop control object for the object to be controlled is:

$$P(s) = \frac{Y(s)}{U(s)} = \frac{b}{s(s+a)} \tag{1}$$

In the formula, the motor speed control object may be expressed as:

$$\ddot{y}(t) + a\dot{y}(t) = bu(t) + d(t) \tag{2}$$

In the formula, y is the system output, u is the reference input, and d is the external disturbance.

(2) The GESO is designed as:

$$\begin{cases} \begin{bmatrix} \dot{z}_1 \\ \dot{z}_2 \\ \dot{z}_3 \end{bmatrix} = \begin{bmatrix} 0 & 1 & 0 \\ 0 & -a & 1 \\ 0 & 0 & 0 \end{bmatrix} \begin{bmatrix} z_1 \\ z_2 \\ z_3 \end{bmatrix} + \begin{bmatrix} 0 \\ b_0 \\ 0 \end{bmatrix} u + L(y - \hat{y}), \\ \hat{y} = \begin{bmatrix} 1 & 0 & 0 \end{bmatrix} \begin{bmatrix} z_1 \\ z_2 \\ z_3 \end{bmatrix}, \end{cases} \tag{3}$$

In the formula, $L=[\beta_1\ \beta_2\ \beta_3]^T$ is the gain of ESO, and $z_1$, $z_2$, $z_3$ are the outputs of ESO: $z_1$, $z_2$ estimate y and its derivative respectively, $z_3$ estimates the total disturbance, and the estimated total disturbance is compensated by the following formula:

$$u = \frac{u_0 - z_3}{b} \tag{4}$$

In the formula, $u_0$ is the output of the FOPD controller.

(3) The transfer function of the FOPD controller is as follows:

$$C_{FOPD}(s) = K_p + K_d s^\mu$$

In the formula, $K_p$ and $K_d$ are the proportional and differential gains, $\mu$ is the differential order, $\mu \in (0, 2)$.

S2 Frequency-Domain Analysis

After performing Laplace transform and solving the formula (3), the following is obtained:

$$Z_3(s) = \frac{\beta_3(s^2 + as)Y(s) - \beta_3 b_0 U(s)}{s^3 + (a+\beta_1)s^2 + (a\beta_2 + \beta_3)s + \beta_3} \tag{5}$$

After combining (1), (4) and (5), the speed loop control model after disturbance compensation is obtained:

$$P_c(s) = \frac{Y(s)}{U_0(s)} = \frac{P(s)B}{b_0 B + \beta_3(s^2 + as)P(s) - b_0\beta_3} \tag{6}$$

In the formula, $$B = +s^3(a+\beta_1)s^2 + (a\beta_2+\beta_3)s + \beta_3$$

$$\beta_1 = 3\omega_o, \beta_2 = 3\omega_o^2, \beta_3 = \omega_o^3 \tag{7}$$

The following relationship is obtained by substituting (1) into (6):

$$P_c(s) = \frac{Y(s)}{U_0(s)} = \frac{1}{s(s+a)} \tag{8}$$

The simplified model obtained from the above formula is not related to the value of $\omega_o$, therefore, the tracking performance is only related to the FOPD controller, and the anti-disturbance performance is only related to $\omega_o$ of GESO.

Figure 2:
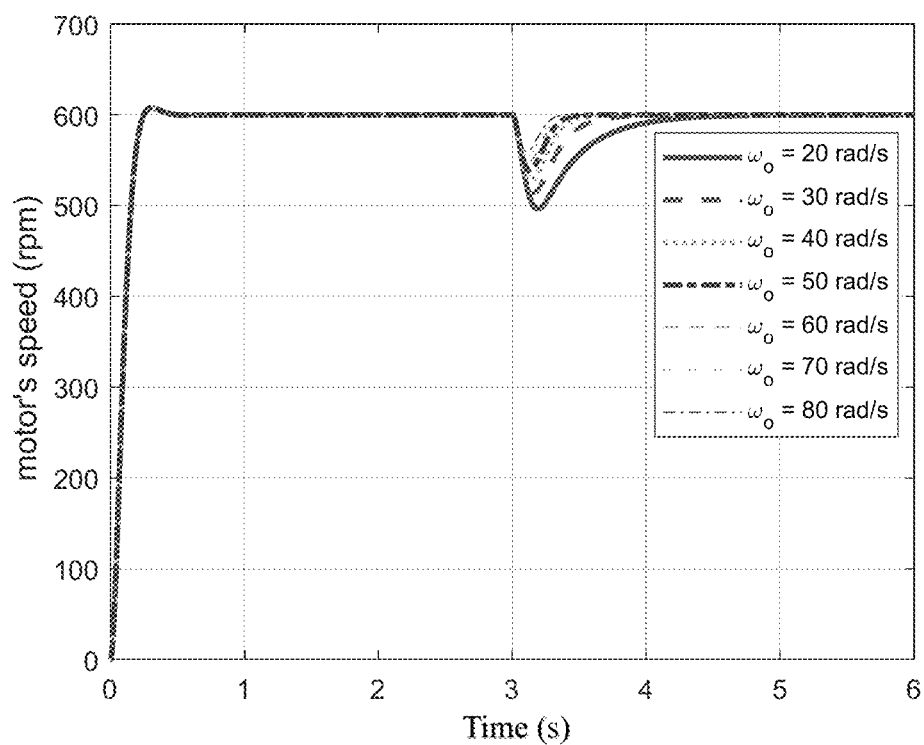
FIG. 2 shows motor speed response under different $\omega_o$ values constructed according to a preferred embodiment of the present disclosure.
Figure 3:
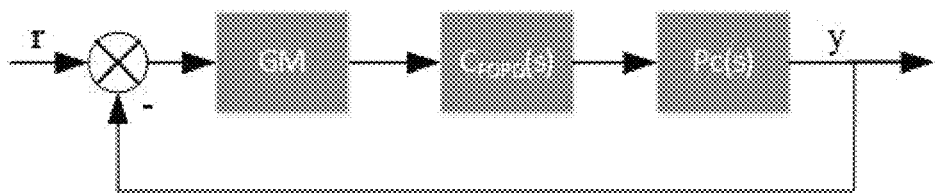
FIG. 3 shows a feedback control system of a simplified model constructed according to a preferred embodiment of the present disclosure.

In order to verify the above conclusions, a set of FOPD controller parameters and different $\omega_o$ are given, the speed simulation results are shown in the figure. As shown in FIG. 2, the FOPG-GESO controller satisfies the principle of separation, therefore, overshoot may be reduced by giving a suitable phase margin, and the anti-disturbance performance may be adjusted by adjusting the value of $\omega_o$.

S3 Solving Unknown Parameters in GESO and FOPD Controllers

In the present disclosure, two frequency-domain indexes and one time-domain index are adopted to design the fractional-order ADRC controller, and the two frequency-domain indexes are:

Phase margin $\arg[C_{FOPD}(j\omega)P_c(j\omega)]_{\omega=\omega_{gc}} = -\pi + \phi$ (9)

Crossover frequency $\|C_{FOPD}(j\omega)P_c(j\omega)\|_{\omega=\omega_{gc}}|_{dB}=0$ (10)

The time-domain index is:
ITAE index $$J_{ITAE} = \int_0^\infty t|e(t)|dt \tag{11}$$

The specific steps for solving are as follows:

The gain-phase margin tester may be adopted. GM is the gain-phase margin tester, which may provide boundary information in the stable region. The transfer function of the gain-phase margin tester is as follows:

$$M_T(A, \phi) = Ae^{-j\phi} \tag{12}$$

The closed-loop transfer function is as follows:

$$G(s) = \frac{M_T(A, \phi)C_{FOPD}(s)P_c(s)}{1 + M_T(A, \phi)C_{FOPD}(s)P_c(s)} \tag{13}$$

The characteristic equation of the closed-loop transfer function is as follows:

$$D(K_p, K_d, \mu, A, \phi; s) = s(s+a) + Ae^{-j\phi}(K_p + K_d s^\mu) \tag{14}$$

Complex root boundary: Substituting $s=j\omega$ into (14), the complex root boundary may be defined as $D(K_p, K_d, \mu, A, \phi; s=j\omega)=0$, namely $$D(K_p,K_d,\mu,A,\phi;s=j\omega)=j\omega(j\omega+a)+Ae^{-j\phi}(K_p+K_d(j\omega)^\mu)=0$$

The real part and imaginary part of the above formula are equal to 0, namely $$-\omega^2+AC_1E+AS_1F=0,$$

$$a\omega+AC_1F-AS_1E=0$$

In the formula, $$S_1 = \sin\phi, C_1 = \cos\phi \qquad (15)$$
$$S_2 = \sin\frac{\mu\pi}{2}, C_2 = \cos\frac{\mu\pi}{2}$$
$$E = K_p + K_d\omega^\mu C_2,$$
$$F = K_d\omega^\mu S_2,$$

According to the above formula, the following is obtained by solving the equation:

$$K_d = \frac{\omega^2 S_1 - aC_1\omega}{A\omega^\mu S_2}, \qquad (16)$$
$$K_p = \frac{\omega^2 - (AC_1K_d\omega^\mu C_2 + AS_1K_d\omega^\mu S_2)}{AC_1}$$

Therefore, the amplitude margin is set as A=1, $\psi$, $\mu$, and $\omega$ are given, the other two parameters ($K_d$, $K_p$) may be determined as a point that satisfies the phase margin $\phi_m=\phi$ and the crossover frequency. $\mu\in(0, 2)$ is scanned to obtain a series of points satisfying $\psi_m$ and $\omega_c$. These points are brought into simulink for simulation, $J_{ITAE}$ is calculated, and the unknown parameters $K_d$, $K_p$ and $\mu$ of the controller corresponding to the smallest $J_{ITAE}$ are selected as the final FOPD parameters, so as to solve the unknown parameters in the FOPD controller.

(2) The FOPD controller and GESO are independent of each other. For GESO, depending on the actual demand for anti-disturbance capability, a reasonable value of $\omega_o$ is selected to be substituted into formula (7) to solve, $\beta_1$, $\beta_2$ and $\beta_3$ to obtain the unknown parameter L in GESO.

Figure 4:
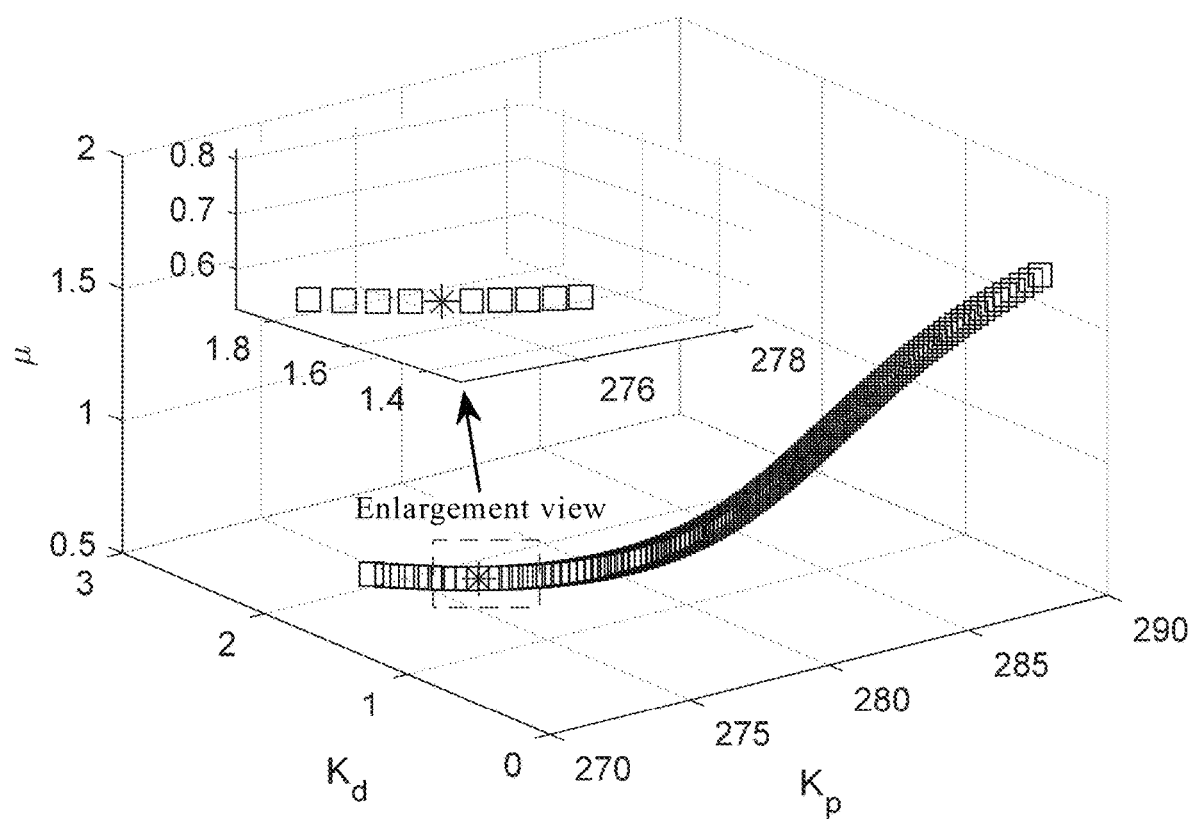
FIG. 4 shows controller parameters satisfying a given frequency-domain index constructed according to a preferred embodiment of the present disclosure.
Figure 5:
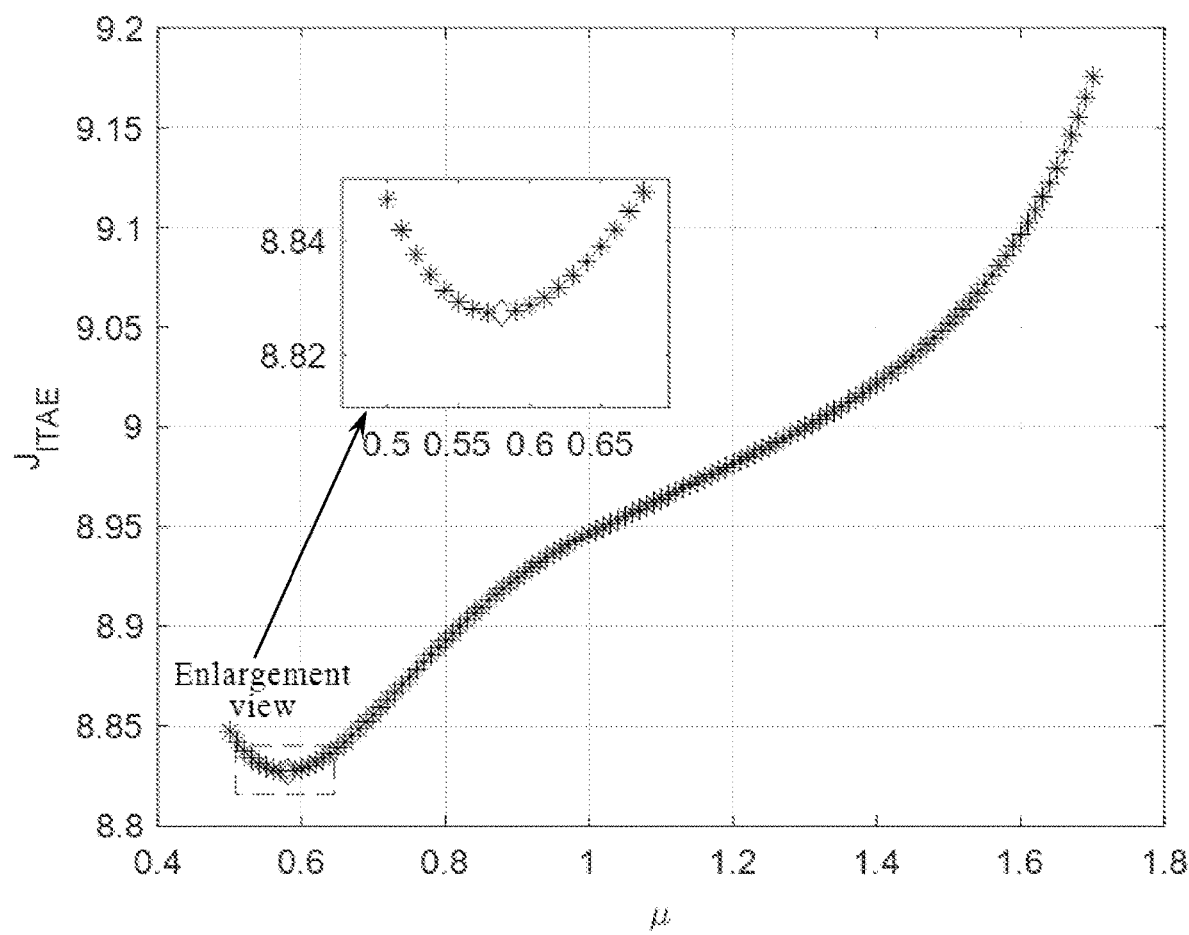
FIG. 5 shows a corresponding diagram of a relationship between $J_{ITAE}$ and $\mu$ constructed according to a preferred embodiment of the present disclosure.

The present disclosure will be further described below in conjunction with specific examples:
1) The specific parameters of the motor speed loop are given as a=26.08, b=383.635, the crossover frequency satisfied by the designed control system is given as $\omega_{gc}$=10 rad/s, and the phase margin is $\phi_m$=70°.
2) By giving a value $\mu$ and setting $\omega=\omega_{gc}$, $\phi=\phi_m$, the parameters of the FOPD controller and the formula (16) may be determined, and all $\mu\in(0, 2)$ are scanned, thereby obtaining all of the parameters of the FOPD controller satisfying the given frequency-domain indexes $\omega_{gc}$, and $\psi_m$ as shown in FIG. 4.
3) A value $\omega_o$=50 is given, the points obtained above are selected in turn for simulation, ITAE is calculated through formula (11), and the results shown in FIG. 5 are obtained. The $\mu$ corresponding to the smallest $J_{ITAE}$ and its corresponding $K_d$ and $K_p$ are selected as the parameters of the FOPD.
4) Load disturbance is added, the value of $\omega_o$ is adjusted to modulate the anti-disturbance performance, and finally $\omega_o$=300 is selected.

Those skilled in the art will easily understand that the above descriptions are only preferred embodiments of the present disclosure, and are not intended to limit the present disclosure. Any modifications, equivalent replacements and improvements made within the spirit and principles of the present disclosure should all be included within the scope to be protected by the present disclosure.

What is claimed is:

1. A designing method for a fractional order proportional derivative (FOPD)-generalized extended state observer (GESO) controller, performed by a computing device to control motors, the designing method comprising the following steps:

S1, selecting an FOPD controller and a GESO to control a motor speed loop, and designing the FOPD controller and the GESO according to a speed control object of the motor speed loop;

S2, performing compensation and simplification on the speed control object of the motor speed loop by using a total disturbance estimated by the GESO to obtain a compensated speed loop control model, the compensated speed loop control model reflects characteristics that a tracking performance is only related to the FOPD controller, and that an anti-disturbance performance is only related to a bandwidth wo of the GESO;

the compensated speed loop control model is performed according to the following formula:

$$P_c(s) = \frac{Y(s)}{U_0(s)} = \frac{1}{s(s+a)}$$

wherein $P_c(s)$ is the compensated speed loop control model; and

S3, respectively solving unknown parameters $K_d$, $K_p$, and $\mu$ in the FOPD controller and an unknown parameter L in the GESO according to the characteristics reflected by the compensated speed loop control model in step S2, wherein parameters of the FOPD controller is tuned based on the solved unknown parameters.

2. The designing method for the FOPD-GESO controller according to claim 1, wherein in step S1, the GESO is:

$$\begin{cases} \begin{bmatrix} \dot{z}_1 \\ \dot{z}_2 \\ \dot{z}_3 \end{bmatrix} = \begin{bmatrix} 0 & 1 & 0 \\ 0 & -a & 1 \\ 0 & 0 & 0 \end{bmatrix} \begin{bmatrix} z_1 \\ z_2 \\ z_3 \end{bmatrix} + \begin{bmatrix} 0 \\ b_0 \\ 0 \end{bmatrix} u + L(y-\hat{y}), \\ \hat{y} = [1\ 0\ 0] \begin{bmatrix} z_1 \\ z_2 \\ z_3 \end{bmatrix}, \end{cases}$$

wherein $L=[\beta_1\ \beta_2\ \beta_3]^T$ is a gain of the GESO, $z_1$, $z_2$, and $z_3$ are outputs of ESO, wherein $z_1$ and $z_2$ respectively estimate derivatives of y and y, $z_3$ is an estimated total disturbance, y is a system output, u is a control rate, that is, an input of a control object of a motor speed, a is a parameter of a motor speed object, $b_0$=b, and b is a motor speed loop object parameter.

3. The designing method for the FOPD-GESO controller according to claim 1, wherein a transfer function of the FOPD controller is:

$$C_{FOPD}(s)=K_p+K_d s^\mu$$

wherein $C_{FOPD}(s)$ denotes the FOPD controller, $K_p$ and $K_d$ are proportional and differential gains, u is a differential order, $\mu\in(0, 2)$, and s is a Laplacian.

4. The designing method for the FOPD-GESO controller according to claim 1, wherein in step S2, the total disturbance estimated by the GESO is utilized, and the estimated total disturbance is performed according to the following formula:

$$u = \frac{u_0 - z_3}{b}$$

wherein b is a motor speed loop object parameter, and $u_0$ is an output of the FOPD controller.

5. The designing method for the FOPD-GESO controller according to claim 1, wherein in step S3, the unknown parameters in the FOPD controller are solved according to the following steps:

S31, constructing a closed-loop control system of the FOPD controller, a gain-phase margin tester and a compensated speed loop control object; and S32, using constraint conditions and boundary conditions of the closed-loop control system to assign values to an amplitude margin A, a phase margin $\phi$, a fractional order $\mu$ and a frequency $\omega$, and calculating the unknown parameters in the FOPD controller.

6. The designing method for the FOPD-GESO controller according to claim 5, wherein in step S31, a transfer function of the closed-loop control system is expressed as follows:

$$G(s) = \frac{M_T(A, \phi)C_{FOPD}(s)P_c(s)}{1 + M_T(A, \phi)C_{FOPD}(s)P_c(s)}$$

wherein a characteristic equation of the transfer function is expressed as follows:

$$D(K_p, K_d, \mu, A, \phi; s) = s(s+a) + Ae^{-j\phi}(K_p + K_d s^\mu)$$

wherein A is the amplitude margin, and $\phi$ is the phase margin.

7. The designing method for the FOPD-GESO controller according to claim 5, wherein in step S32, the constraint conditions refer to the phase margin, a crossover frequency and an ITAE index, wherein the phase margin is performed according to the following relation formula:

$$\arg[C_{FOPD}(j\omega)P_c(j\omega)]|_{\omega=\omega_{gc}} = -\pi + \phi$$

wherein $\omega_{gc}$ is the crossover frequency, $\omega$ is the frequency, $C_{FOPD}(j\omega)$ is a fractional order controller, and $P_c(j\omega)$ is the compensated speed loop control model;

the crossover frequency is carried out according to the following relation formula:

$$\|C_{FOPD}(j\omega)P_c(j\omega)|_{\omega=\omega_{gc}}|_{dB} = 0$$

wherein dB is a unit of amplitude;

the ITAE index is carried out according to the following relation formula:

$$J_{ITAE} = \int_0^\infty t|e(t)|dt$$

wherein t is a real-time simulation time, e(t) is a difference between a reference input and a system output, and $J_{ITAE}$ is the ITAE index.

8. The designing method for the FOPD-GESO controller according to claim 5, wherein the boundary condition refers to a complex root boundary condition, and formulas of the unknown parameters $K_d$ and $K_p$ are obtained according to the complex root boundary condition as follows:

$$K_d = \frac{\omega^2 S_1 - aC_1\omega}{A\omega^\mu S_2},$$

$$K_p = \frac{\omega^2 - (AC_1 K_d \omega^\mu C_2 + AS_1 K_d \omega^\mu S_2)}{AC_1}$$

$$S_1 = \sin\phi, \quad C_1 = \cos\phi$$

$$S_2 = \sin\frac{\mu\pi}{2}, \quad C_2 = \cos\frac{\mu\pi}{2}$$

$$E = K_p + K_d \omega^\mu C_2$$

$$F = K_d \omega^\mu S_2$$

wherein $S_1, S_2, C_1, C_2$, E and F are intermediate variables.

9. The designing method for the FOPD-GESO controller according to claim 1, wherein in step S3, a solution of the unknown parameter L in the GESO is to select $\omega_o$ according to an actual required anti-disturbance performance, and the unknown parameter L is calculated according to the following formula:

$$\beta_1 = 3\omega_o$$

$$\beta_2 = 3\omega_o^2$$

$$\beta_3 = \omega_o^3$$

$$L = [\beta_1 \beta_2 \beta_3]^T$$

wherein $\omega_o$ is the bandwidth of the GESO.

\* \* \* \* \*